Figure 3:
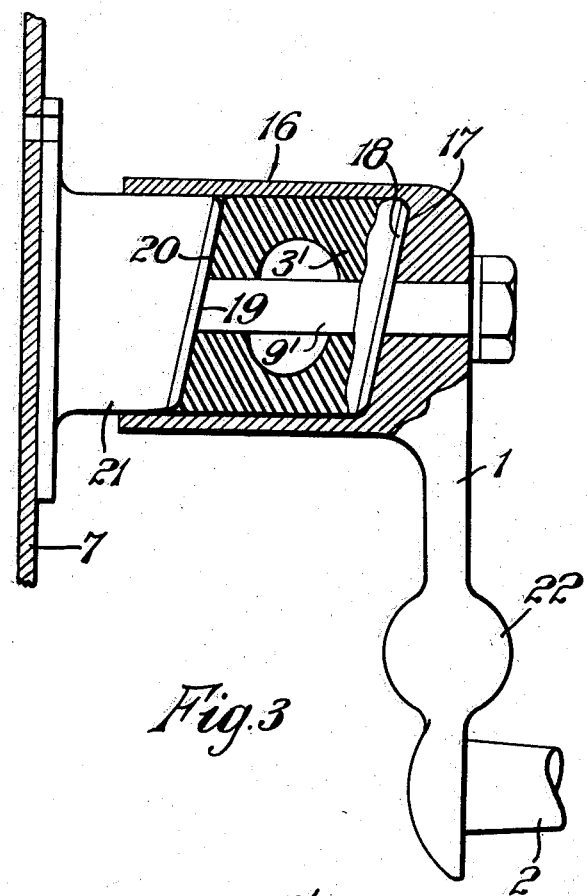

Dec. 15, 1964    J. RIX    3,161,420
SPRING SUSPENSION ARRANGEMENT IN WHICH SWINGING MOVEMENT
OF AN ELEMENT IS TRANSLATED IN AN AXIAL
THRUST ON A SPRING ELEMENT
Filed Nov. 29, 1961    4 Sheets-Sheet 1
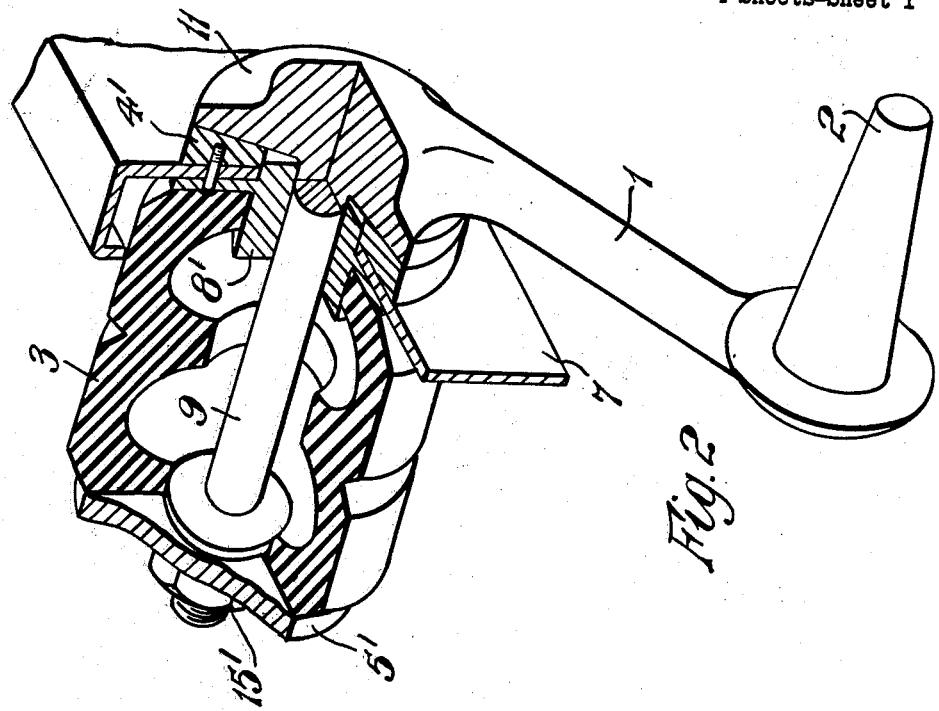
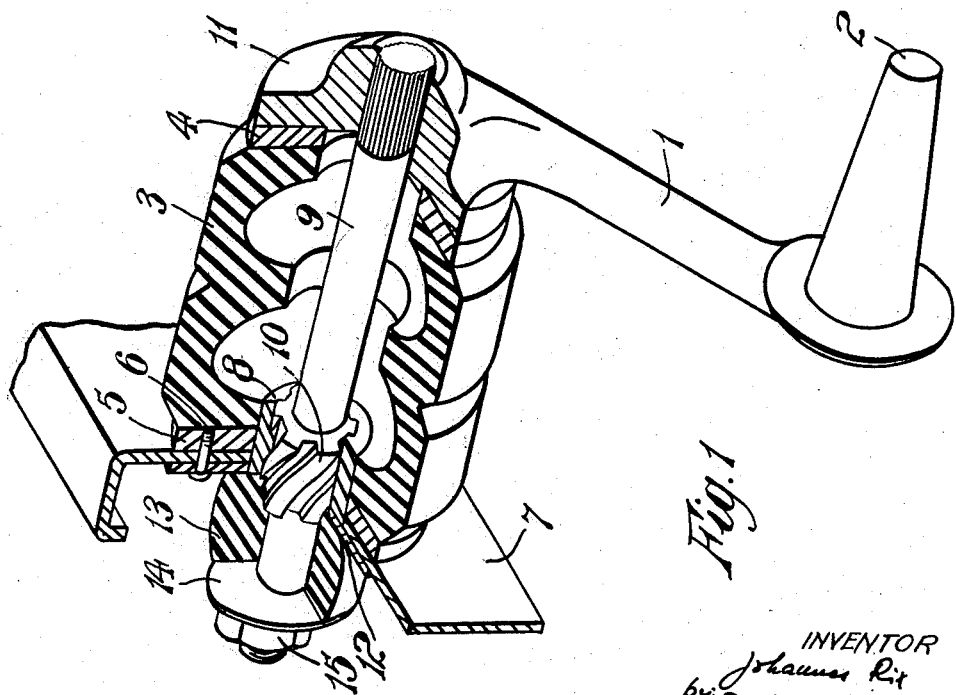
INVENTOR
Johannes Rix
by: Michael J. Striker
Atty Dec. 15, 1964  J. RIX  3,161,420
SPRING SUSPENSION ARRANGEMENT IN WHICH SWINGING MOVEMENT
OF AN ELEMENT IS TRANSLATED IN AN AXIAL
THRUST ON A SPRING ELEMENT
Filed Nov. 29, 1961  4 Sheets-Sheet 3
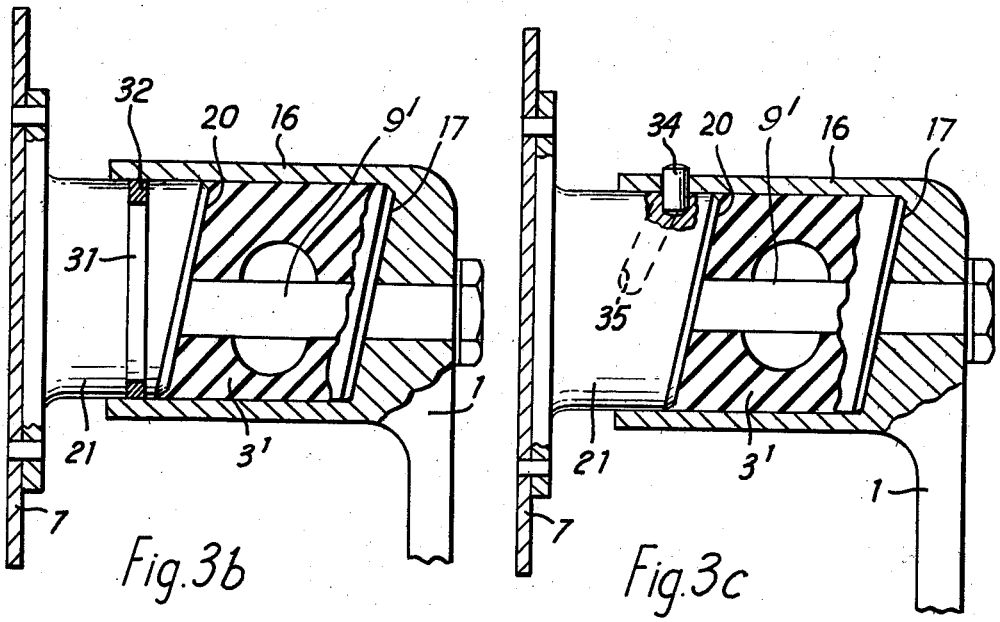
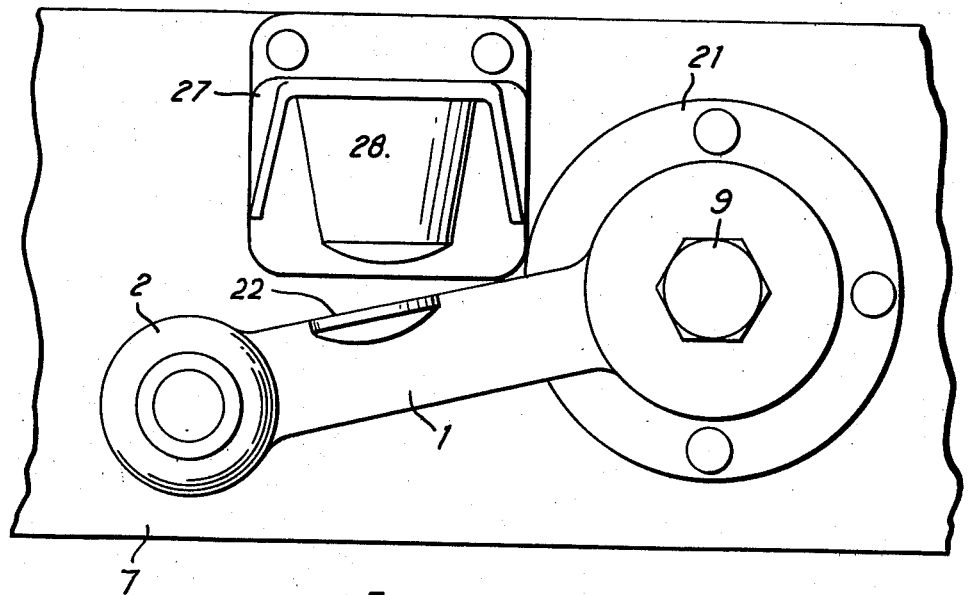

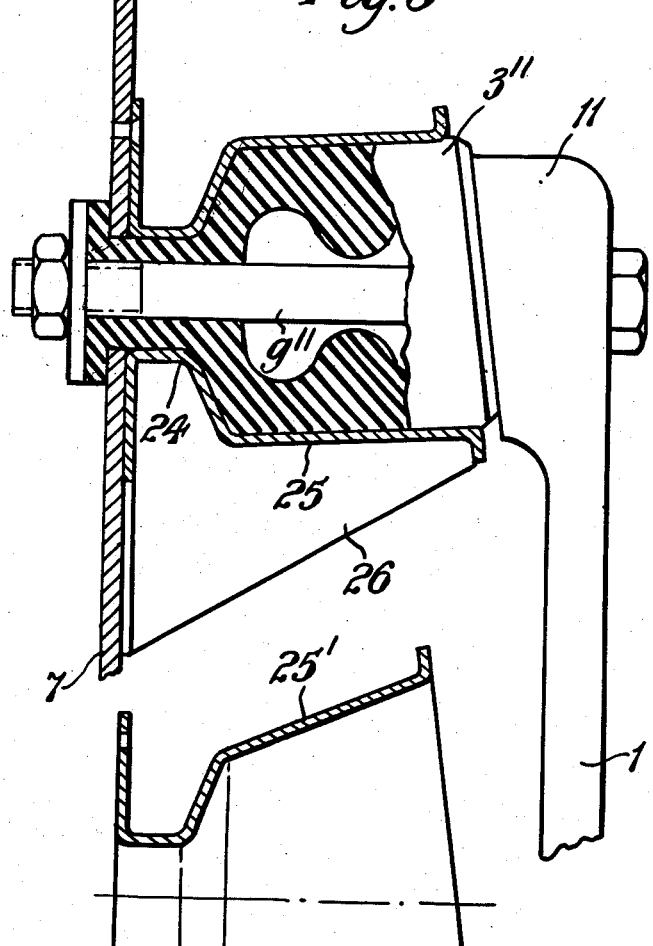
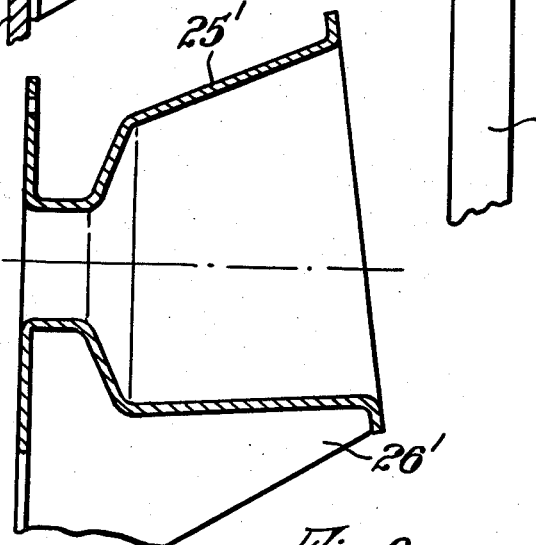

United States Patent Office 3,161,420
Patented Dec. 15, 1964

3,161,420
SPRING SUSPENSION ARRANGEMENT IN WHICH SWINGING MOVEMENT OF AN ELEMENT IS TRANSLATED IN AN AXIAL THRUST ON A SPRING ELEMENT
Johannes Rix, Kassel, Germany, assignor to Aeon Products (London) Limited, London, England
Filed Nov. 29, 1961, Ser. No. 155,710
17 Claims. (Cl. 280—124)

This invention relates to vehicle spring suspension devices, particularly for vehicles with independent wheel suspension and wheels guided by steering links, using springs of rubber or synthetic plastic material.

Motor vehicle spring suspensions are known which have single, double or triangle steering links for the wheel guidance and spiral, helical or leaf springs or torsion elements of steel or rubber as spring elements.

Thus wheel suspensions are known having an oscillating bolt or pin of the swinging arm supported within a torsion loaded spring element, the axes of the stub axles being parallel to the axis of the oscillating pin. The spring element is thereby torsion loaded and connected at each end with the chassis frame and with the swinging arm or steering link. In addition similar spring suspensions are known having a spring element consisting of ring shaped rubber elements vulcanized between sheet metal plates with several of these single elements connected in parallel.

Spring suspensions of this type have the disadvantage that the pins or bolts of the swinging arms passing through the opening of the rubber torsion element are additionally subjected to bending and further that the vulcanized surfaces of the rubber elements can only bear a relatively small specific load.

In practice springs of this type have failed particularly due to this small load bearing capacity of the vulcanized surfaces and to the low bending resistance since after wear of the vulcanization there are no remaining emergency properties.

In order to eliminate the disadvantages of spring suspension systems using spring elements of rubber or synthetic plastic material the invention is based on the idea that rubber spring elements should preferably be pressure loaded and the vulcanized surfaces avoided.

It must be further endeavoured not to eliminate the free forming capacity of the rubber spring elements stressed mainly in axial direction for pressure but to influence this capacity only to such an extent that it produces a desirable increase of progressiveness and that the stiffening of the element, which increases under load, adds to the guidance of the oscillating pin and to the absorption of guiding forces vertical to the oscillating axis. It is known that a force acting on a rubber spring element causes only a change of form but not of volume. For obtaining an efficient spring suspension the invention therefore provides such elements of rubber or the like loaded preferably in direction of the longitudinal axis thereof. These elements have flat ends and transverse expansion of the flexible material is counteracted by reinforcing or binding. The spring elements are so constructed that they can be subjected to extensive deformation over the entire constructional height of the spring element in longitudinal direction without any obstruction by vulcanized parts utilising the entire spring volume. By this construction a higher specific loading of the spring elements is possible without the risk of vulcanized parts tearing off. For obtaining an axial thrust on the rubber spring elements the invention provides for the conversion of the rotational movement of the steering links or swinging arms into a movement in axial direction of the rubber spring elements, for example in such a manner that by means of threads on the oscillating pin, or helically extending thread surfaces, oblique surfaces, tapered surfaces of hardened or flexible material at the rubber spring elements, the latter are exposed to pressure. It is known that spring elements of rubber or elastic material can be loaded by pressure to a much higher degree than by torsion. Such a pressure loading results in a desirable progressive characteristic curve as compared to a straight line curve resulting from a pure torsion load.

With the design used in this invention the pressure load on the rubber elements having a high degree of deformability has a favourable effect in so far as the rubber elements become laterally more stable with an increase of pressure load, and forces at right angles to the axial extension can be absorbed.

By this invention the progressiveness of the spring suspension is essentially increased as compared to a torsion spring suspension, without necessitating more weight or volume. A further advance obtained with the present invention is the fact that with simultaneous support of its inner and outer faces the spring element receives its load in axial direction at the faces and that the rubber element at the same time serves as a flexible bearing for the guidance of the suspension of the steering link or the swinging arm.

In order that the invention may be more readily understood, reference is made to the accompanying drawings, which illustrate diagrammatically and by way of example, several embodiments thereof, and in which:

FIGURE 1 is a perspective view of a spring suspension device for the swinging arms, with a cutaway portion of the rubber spring and showing means for converting the rotation movement into an axial movement against the rubber spring in the form of an oscillating bolt or pin with coarse thread and nut.

Figure 4:
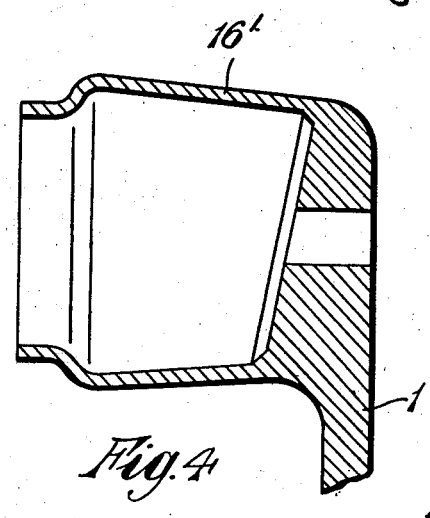

FIGURE 2 is a view similar to that of FIGURE 1 wherein the means for conversion of the rotation movement into an axial thrust on the rubber spring element are in the form of surfaces, FIGURE 3 is a partial section of a device with a rubber spring under stress through oblique surfaces with a cylindrical sleeve surrounding the spring, mounted rotating with the oscillating lever, FIGURE 3a is a side view showing an additional rubber spring adapted to cooperate with the swing arm, FIGURES 3b and 3c are respectively partial sections and showing modifications of the device illustrated in FIG. 3, FIGURE 4 shows a sleeve at the oscillating lever according to FIGURE 5 with a tapered part surrounding the spring, FIGURE 5 is a further embodiment of the device showing a rubber spring element bevelled at the face. The oscillating pin is mounted in the tapered neck portion of the rubber spring. The exterior surface is limited and guided by a sleeve of harder material surrounding the spring, and FIGURE 6 is a section through the sleeve of harder material with unilateral conical extension, surrounding the spring.

For the resilient mounting of the swinging arm 1 in FIG. 1 which has a stub axle 2 (wheel not shown), a hollow rubber spring 3 is provided having a disc 4 and 5 at each end. The disc 4 may be in loose contact with the outer face of the hollow rubber spring, while the disc 5 has threaded holes 6 for accommodating the screws for mounting the device on the chassis frame 7.

The inner face of the hollow rubber spring 3 may be firmly anchored to the metal disc 5 through the threaded holes 6 or through a dished shaping of the rim of metal disc 5, so that it becomes firmly clamped to that disc if axial pressure is exerted. For obtaining the spring effect, however, this is not necessary as it is sufficient if the face of the spring has a firm support. Also fastened to the frame 7 by screws or by any other suitable means is a bush 8 provided internally with a thread. The bush 8 extends through a bore hole in the metal disc 5 into the centre bore of the hollow rubber spring 3. An oscillating bolt or pin 9 provided with a thread 10 at the inner end which meshes with the inside thread of the bush 8, is firmly connected to the swinging arm 1 at the outer end.

An extension of the pin 9 beyond the threaded portion carries a floating disc 12 which serves to limit the axial movement of the pin 9. This axial movement can additionally be cushioned by a rubber pad 13 which is limited by a disc 14 on the oscillating pin 9 and retained by a nut 15.

The forces to be transmitted from the wheel through the swinging arm 1 to the chassis frame are taken up by the bolt 9 which screws into the bush 8. The hollow rubber spring 3 having a favourable form factor is thereby axially compressed without being subjected to any substantial torsional strain. Reaction caused by an excessive swing of the swinging arm 1 in the opposite direction causes the rubber pad 13 to be flexibly compressed between discs 12 and 14 thus acting as damper. The hollow rubber spring 3 becomes stiff if axially compressed, due to the walls approaching each other progressively. This effect is further increased by the twisting of the spring which occurs at the beginning of the torsion movement, so that a completely stiff body is presented which also absorbs lateral forces, thus equally serving as a sufficiently rigid support against the stresses exerted on the spring 3 due to the wheel guidance forces.

In the example shown in FIG. 2 flange 11 of the swinging arm 1 has an oblique inner surface to match a correspondingly shaped oblique surface of a disc 4' of hard or flexible material. Pin 9, firmly connected to the swinging arm 1, has at its inner end a disc 5' which is secured against axial movement and centred in the rubber spring 3 by a collar. Nut 15' serves for fixing and adjusting the axial position of the disc 5'. Pin 9 is guided in the bush 8' secured to the frame 7. Forces transmitted from the wheel through the swinging arm 1 to the chassis frame are in this case converted by the oblique surfaces of the flange 11 and the disc 4', into an axial thrust causing an axial spring action by simultaneous stiffening of spring body 3. Also the forces occurring at right angles to the wheel plane can thus be resiliently absorbed. The bush 8' can also be constructed as a flexible bush. Placing the rubber spring at the inside of the chassis frame results in a favourable space utilisation for the wheel suspension and favourable absorption of the guidance forces acting on the spring suspended wheel. The axial thrust on the rubber spring as provided for in the invention may also be achieved by the oblique surfaces 4' and 11 instead of by disc 5'.

In the embodiment shown in FIG. 3 the swinging arm 1 with a bush 16 having an oblique inner surface 17 encloses a rubber spring element 3' which is in contact with the respective faces of rubber spring 3' with surfaces 18 and 19. Surface 19 is thereby located on a corresponding surface 20 of a guide 21 which in turn is firmly fixed on the frame 7. According to the desired pre-tension the rubber spring 3' may be provided with oblique surfaces in unloaded condition. It is also possible to fix the spring in such a manner that its faces come into contact with surfaces 17 and 20 only after fixing the spring in place. The pin 9' is firmly connected to the swinging arm 1 and passes through the rubber spring element 3' and guide 21. It can be rotated against the frame. Normal readjusting devices can be provided between pin 9' and the frame 7, for example by providing the screw connections with serrations to achieve an adjustment from the position of rest. The forces transmitted from the wheel via the swinging arm 1 to the chassis frame 7 are absorbed by the spring element 3' which due to the surfaces 17 and 20 bearing against one another under torsion are pressure loaded. The inner clearance width of part 16 at the swinging arm 1, can be so adjusted in axial direction, that with increasing swing of the arm, the spring element 3' by its increasing expansion is progressively pressed against the walls, thus ensuring an appropriate stiffness also in transverse direction to the axis of the swinging arm.

For increasing the progressiveness the swinging arm may, with all of these arrangements be additionally supported against a bracket mounted rubber spring located laterally on the frame 7. Thus, FIG. 3a discloses a rubber spring 28 mounted on a bracket 27 located on the frame 7 laterally of the swinging arm 1. The swinging arm 1 is in this case provided with a corresponding contact surface 22 adapted to abut against the rubber spring 28.

In FIG. 3b the swinging arm 1 is guided on the member 21 by means of collar 32 on the sleeve 16 engaging in a groove 31 provided on the guide 21. A pin 9' may additionally be provided for support purposes, which takes no part in producing the compression of the rubber spring 3' which is effected by the inclined surfaces as described with reference to FIG. 3.

FIG. 3c illustrates a further arrangement in which compression of the rubber spring 3' is effected through the inclined surfaces 17 and 20 and is assisted by the meshing of guide 21 and sleeve 16 by means of a coarse thread constituted by a helical groove 35 and a pin 34. The helical groove 35 is formed in the sleeve 16 and the pin 34 projects from the guide 21. The arrangement can of course be reversed while producing the same result. Here again, a pin 9' may be provided for supporting the swinging arm 1 on guide 21.

FIG. 4 shows an example of another arrangement of the swinging arm head with the sleeve surrounding the spring. The sleeve 16' is tapered in order to provide space for the increase of diameter of the spring element caused by the swinging arm deflection. By this taper the progressiveness of the torsion spring suspension and the stiffness in vertical direction to the swinging arm rotating axis can be so affected that the lateral forces are mainly absorbed by the stiff rubber spring.

Several elements can be combined in series in the embodiment shown in FIGS. 3 and 4. The elements of the invention may also be combined in parallel.

FIG. 5 shows a further embodiment of the invention wherein the rubber spring element 3'' is provided with a reduction 24 in which a bolt 9'' is flexibly supported. In this arrangement the rubber spring 3'' has a face which is normal with regard to its axis if unloaded. Head 11 of the swinging arm 1 has an oblique surface. By axial bracing of spring 3'' against the surface of the head 11 the rubber spring is compressed unilaterally and the outer and inner walls support each other at this side, so that a stiffening is obtained at the wall side compressed in axial direction. During the rotational movement of the swinging arm 1 the side not yet compressed also becomes unilaterally pressure loaded. By providing a sleeve 25 of harder material around the hollow spring element the compressed wall parts can no longer give way. In this way the wall parts not yet prestressed become partly effected by axial impact during the rotational movement of the swinging arm 1, so that the spring suspension becomes effective.

A support 26 is provided for bracing the sleeve 25 which is connected to the frame 7 or with an appropriately fixed part in a known manner. This permits transmission of guide forces to the chassis frame.

FIG. 6 shows another construction of the sleeve 25 of FIG. 5. The walls 25' of the sleeve in FIG. 6 are shown with a unilateral taper. This construction causes the spring to progressively contact the interior walls of sleeve 25' as a result of the unilateral axial load caused by the unilateral increase of diameter.

I claim:
1. A spring suspension for vehicles, particularly for motor vehicles with independent wheel suspension, comprising a swinging arm, a torsion rod fast with said arm, a hollow rubber spring element adapted to be mounted around the torsion rod and freely axially braced between said arm and the chassis frame of the vehicle, and means associated with the torsion rod and the swinging arm for converting swinging movements of the arm and corresponding torsional movements of the rod into an axial thrust to cause substantially only axial compression of the rubber spring element whereby progressively to stiffen the spring element so as to support the torsion rod and to absorb forces transverse to the axis of the torsion rod.

2. A spring suspension as claimed in claim 1, wherein said means include a coarse thread provided on the torsion rod and co-operating with a threaded bush firmly fixed in the chassis frame.

3. A spring suspension as claimed in claim 1, wherein said means include a head on the said swinging arm formed with an oblique surface co-operating with a corresponding oblique surface formed on a disc secured to the chassis frame.

4. A spring suspension as claimed in claim 3, wherein the spring element is interposed between the oblique surface on the head and oblique surface on the disc and the head is formed with a sleeve extending around the spring element and encasing the same.

5. A spring suspension as claimed in claim 4, wherein the sleeve is frusto-conical in shape.

6. A spring suspension as claimed in claim 1, wherein said spring element fixed between the chassis frame and the swinging arm has axis-normal faces at least at one end and is unilaterally compressed between the chassis frame and the arm through said means which includes an oblique surface at the head of the arm and said chassis frame including an exterior sleeve fixed to said frame against which said spring element is supported.

7. A spring suspension as claimed in claim 6, wherein said sleeve is unilaterally tapered.

8. A spring suspension as claimed in claim 6, wherein the sleeve is braced against the chassis frame.

9. A spring suspension as claimed in claim 1, wherein at least two spring elements are mounted in parallel between the chassis frame and the swinging arm.

10. A spring suspension as claimed in claim 1, wherein the spring element is axially braced between end discs.

11. A spring suspension as claimed in claim 1, wherein buffer means are provided for imparting a counter spring action when the swinging arm rebounds.

12. A spring suspension as claimed in claim 11, wherein said buffer means is provided on an extension of the torsion rod and bears against the chassis frame.

13. A spring suspension as claimed in claim 11, wherein said buffer means is provided on the chassis frame and bears laterally against the swinging arm.

14. A spring suspension as claimed in claim 1, wherein the spring element is formed with a neck providing a flexible bearing for mounting the device in the chassis frame.

15. A spring suspension as claimed in claim 1, wherein the spring element is non-symmetric with respect to its axis.

16. An arrangement of the character described comprising, in combination, support means having a first abutment surface; swing arm means having a second abutment surface spaced from and facing said first abutment surface, said swing arm means being mounted on said support means turnably about an axis transverse to said abutment surfaces; a rubber spring element having a pair of ends abutting respectively against said first and second abutting surfaces freely slidable with respect thereto; a sleeve forming part of said swing arm means extending over and encasing said rubber spring element; and helical guide means associated with said support means and said swing arm means for converting swinging movement of said swing arm means about said axis into axial thrust on said rubber spring element to cause substantially only axial compressions thereof so that said rubber spring element will be progressively compressed to progressively resist swinging movement of said swing arm means.

17. A spring suspension as claimed in claim 1, wherein at least two spring elements are mounted in series between the chassis and the swinging arm.

References Cited in the file of this patent
UNITED STATES PATENTS

| | | |
|---|---|---|
| 807,968 | Seery | Dec. 19, 1905 |
| 1,716,497 | McCaskell | June 11, 1929 |
| 2,092,613 | Olley | Sept. 7, 1937 |